Sept. 29, 1942. W. H. KITTO ET AL 2,296,855
REFRIGERATION
Filed July 20, 1938
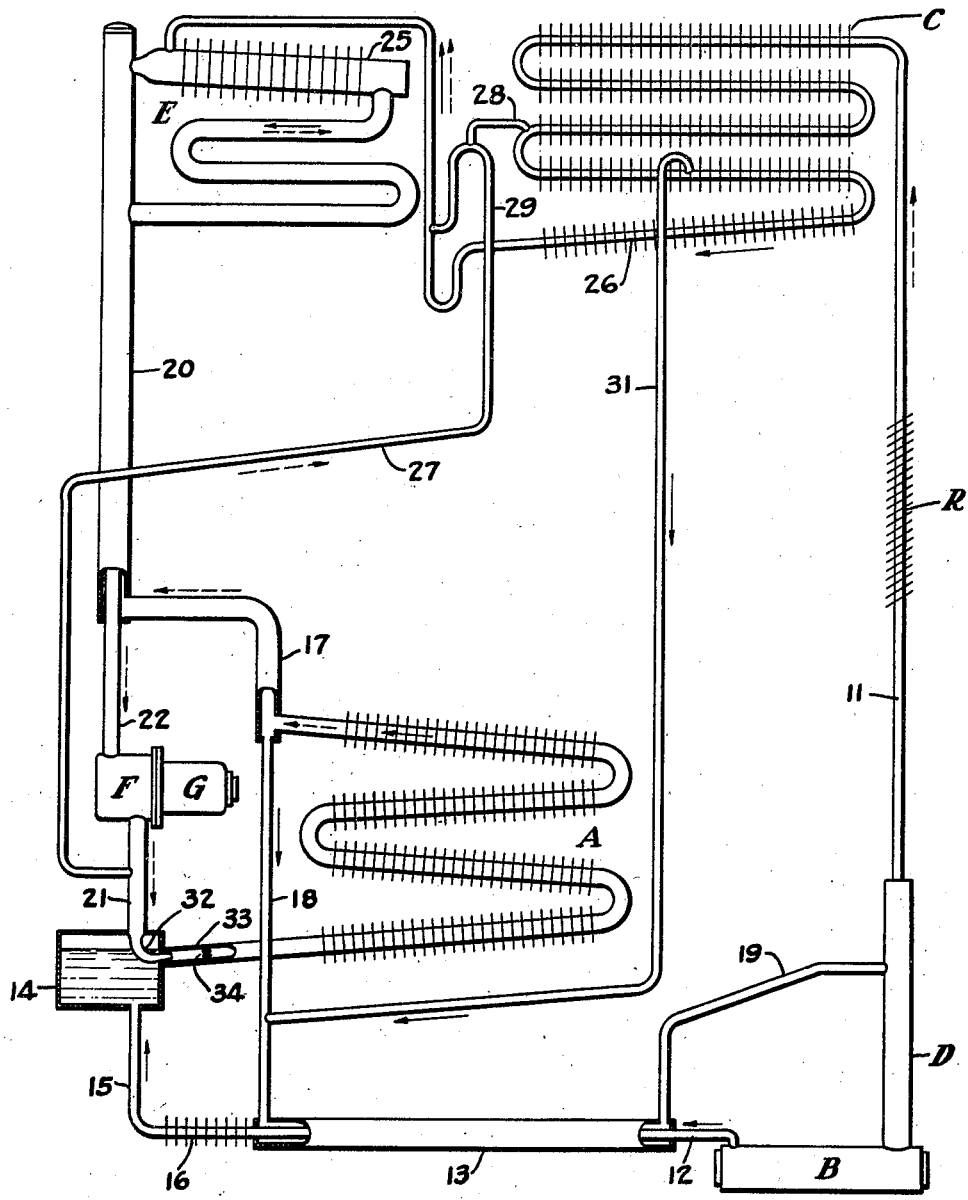
INVENTOR
William H. Kitto
Arnold D. Siedle
BY
Harry J. Dumarse
ATTORNEY Patented Sept. 29, 1942

2,296,855

UNITED STATES PATENT OFFICE 2,296,855

REFRIGERATION

William H. Kitto and Arnold D. Siedle, Canton, Ohio, assignors to The Hoover Company, North Canton, Ohio, a corporation of Ohio Application July 20, 1938, Serial No. 220,185
In Great Britain August 20, 1937

19 Claims. (Cl. 62—119.5)

This invention relates to refrigerating systems and more particularly to absorbers designed for use in three-fluid absorption refrigerating systems.

Heretofore, the various pumping devices such as a vapor-lift pump or a gas-lift pump have been utilized in three-fluid absorption refrigerating systems to circulate the absorption solution through a circuit including the boiler, analyzer, and absorber. These crcuits, while satisfactory in operation, have necessitated a complex and troublesome pumping and piping assembly.

We have devised an absorption refrigerating system in which the gas normally circulating through the absorber is utilized to propel the absorption liquid therethrough and hence through the absorption solution circuit. More specifically, a propelled stream of pressure equalizing medium, preferably a dense inert gas such as nitrogen, will drag or sweep the absorption solution upwardly through the absorber whereby the absorber itself and the fan normally utilized to circulate pressure equalizing medium function to circulate the absorption solution.

Our absorber not only functions as a solution circulating pump and as an absorber per se, but it also insures that the liquid shall be carried therethrough under extremely turbulent conditions and with the most intimate contact with the inert gas stream whereby to insure efficient gas and liquid contact. Also, the liquid is conveyed through the absorber in a divided and turbulent form whereby it repeatedly strikes, wipes, and splashes against the walls of the absorber vessel thereby insuring efficient rejection of the heat of absorption. This last is of prime importance due to the fact that heat rejection at the absorber forms the bottle neck of the entire refrigerating system; that is, the efficiency of the system is directly dependent upon the ability of the absorber, first to absorb refrigerant vapor from the stream of pressure equalizing medium passing therethrough, and secondly, the ability of the absorber to reject the heat of absorption to the surrounding medium as rapidly and at as low a temperature as possible.

Other and more specific objects and advantages of the invention will become apparent as the description proceeds when taken in connection with the accompanying drawing in which:

The single figure is a diagrammatic illustration of a refrigerating system embodying our invention.

Referring now to the drawing it will be seen that we have illustrated a continuous three-fluid absorption refrigerating system comprising a boiler B, an analyzer D, a rectifier R, a condenser C, an evaporator E, an absorber A, and a pressure equalizing medium circulating fan F driven by an electrical motor G. The elements of the system are connected by various conduits to provide a plurality of gas and liquid circuits included within a complete refrigerating system.

It will be understood that the system just described is suitably charged with a refrigerant such as ammonia, and an absorbent such as water, and a pressure equalizing medium, preferably a dense inert gas such as nitrogen.

The boiler B is heated in any suitable manner as by a gas burner or an electrical cartridge heater. The heating means for the boiler B and the motor G are controlled by any suitable control mechanism. A preferred control mechanism is illustrated in the co-pending application of Curtis C. Coons, Serial No. 148,424 filed June 16, 1937, Patent No. 2,228,343.

During normal operation the boiler B contains a solution of refrigerant in an absorbent which liberates the refrigerant vapor when heat is applied to the boiler. Refrigerant vapor generated in the boiler B passes upwardly through the analyzer D in counterflow relation to strong solution. Vapor of absorption solution generated in the boiler B condenses in the analyzer, the heat of condensation serving to generate more refrigerant vapor from the strong solution. The refrigerant vapor is conducted from the analyzer D to the condenser C through a conduit 11 which includes an air-cooled rectifier R. The rectifier R condenses any absorption solution vapor which may pass through the analyzer D. The refrigerant vapor is liquefied in the condenser C preferably by heat exchange with the surrounding air.

The boiler B and the absorber A are included within a solution circuit now to be described. Weak solution formed in the boiler B passes therefrom through a conduit 12 into the inner path of a liquid heat exchanger 13. The weak solution is conducted from the solution heat exchanger 13 into the bottom of a weak solution reservoir 14 through a conduit 15 which may include air-cooling fins 16, if desired. The weak solution travels upwardly through the absorber A with the pressure equalizing medium refrigerant vapor mixture in a manner to be described more fully hereinafter. For the present it is sufficient to note that strong solution is formed in the absorber A and collects in the bottom of the weak gas conduit 17 connected to the upper end of the absorber. The strong solution is conveyed from the conduit 17 to the outer path of the liquid heat exchanger 13 through a conduit 18. Strong solution is conveyed from the liquid heat exchanger 13 to the upper portion of the analyzer D through a conduit 19, thus completing the absorption solution circuit.

The absorber A and the evaporator E are also included within a pressure equalizing medium circuit now to be described. Pressure equalizing medium under pressure is discharged from the fan F through a conduit 21 into the bottom portion of the absorber A through which it travels upwardly into the conduit 17 which connects to the outer path of the gas heat exchanger 20. The weak gas passes from the outer path of the gas heat exchanger 20 into the bottom of the evaporator E. The strong gas formed in the evaporator is discharged into the inner path of the gas heat exchanger 20 and is conveyed therefrom into the suction inlet of the fan F through a conduit 22, thus completing the pressure equalizing medium circuit.

Liquid refrigerant formed in the condenser C is conveyed from the bottom thereof into the finned box-cooling section 25 of the evaporator E. It will be noted that the bottom of the condenser extends well below the top portion of the evaporator whereby the liquid must be elevated into the evaporator. For this purpose a gas bleed-off conduit 27 is connected between the circulating fan discharge conduit 21 and the conduit 26 below the liquid level therein whereby liquid refrigerant is elevated into the evaporator by gas-lift action. A gas vent conduit 28 is connected between the lower portion of the condenser C and an inverted U-shaped portion 29 of the conduit 27. The U-shaped portion 29 of the conduit 27 extends above the level of the top of an overflow conduit 31, to be described later, and prevents liquid refrigerant from flowing therethrough into the weak solution contained in the reservoir 14. The overflow conduit 31 is connected between the condenser C below the connection of the vent 28 thereto and the strong solution return conduit 18.

The conduit 21 is provided with an angle nozzle 32 which extends below the normal liquid level in the reservoir 14 and projects into the end of the lowest absorber conduit 33. During normal operation of the system, inert gas under pressure is discharged through the conduit 21 and nozzle 32. This gas stream drags or sweeps the absorption solution contained in the reservoir 14 upwardly through the absorber A and into the trap formed in the bottom portion of the weak gas conduit 17. The solution carried upwardly through the absorber by the gas stream is subjected to extreme agitation and is frequently in the form of relatively fine particles which are repeatedly thrown against one another and against the walls of the arbsorber A. If desired, a small metering orifice 34 may be provided in the lowest part of the absorber A and adjacent the nozzle 32 whereby to regulate the rate of flow of absorption solution through the absorber.

It is advantageous to circulate a relatively great volume of rich gas through the absorber per unit of time as compared with the quantity of absorption solution circulating through the absorber per unit of time. This arises from the fact that it is advantageous to supply highly concentrated absorbing solution to the generator, and the quantity of refrigerant per unit volume of rich gas is insufficient to increase the concentration of a unit volume of absorption solution appreciably. This invention provides a system whereby efficient absorption and heat rejection are secured while a large volume propelled stream of rich gas is circulating through the absorber and is dragging a relatively small volume of absorbing solution through the absorber and in intimate contact therewith. Consequently, the velocity of flow of the inert gas stream through the absorber is greater than the velocity of flow of the absorbing solution through the absorber.

The elevating power of the inert gas is a function of its pressure, density, and velocity. In general, an increase in the value of any one or more of these factors will increase the elevating power of the inert gas. It is preferred to use a relatively small diameter conduit for the absorber and a dense inert gas in order that the gas velocity may be maintained at a high value without requiring an unduly large fan or the circulation of excessive quantities of the gas. It has been found that nitrogen will elevate liquid several inches through a vessel having passageways therethrough of approximately one-half inch inside diameter with a pressure drop of between two and four inches of water between the inlet and outlet connections to the vessel, and with the total system pressure ranging between 270 and 400 pounds per square inch. These figures are illustrative only; they are not limiting in any sense.

The pressure equalizing medium conveys the absorption solution through the horizontal or slightly inclined conduits of the absorber by sweeping or dragging the solution along the bottom of the conduits. A body or column of the solution is supported by the pressure equalizing medium in the rising or elevating absorber conduits. The pressure equalizing medium blows or blasts through the bodies or columns of liquid so supported and carries a part thereof to a higher elevation. Absorption thus occurs in zones in which the pressure equalizing medium is sweeping across and propelling the solution, and in zones in which the pressure equalizing medium is forcing itself through a body of the solution while removing a portion of that body of the solution to a higher elevation.

While the absorber has been illustrated merely as a continuous reversely bent finned conduit positioned in a vertical plane, it is to be understood that other forms and constructions may be used. For example, the absorber may comprise a plurality of substantially parallel conduits positioned in a plane inclined slightly from the horizontal and connected at their ends by return bends.

The action of the inert gas on the absorption solution may be briefly described as follows: In substantially horizontal conduits the gas stream flows over a stream of liquid in the bottom portion of the conduit to which it imparts a propelling force by the frictional drag of the gas stream as it passes over the liquid. Additionally, the dragging action of the gas on the liquid serves to agitate the liquid stream which improves the gas and liquid contact therebetween and aids the absorbing process. In the elevating or rising conduits, the gas stream supports a body of liquid in a divided state through which the gas continuously forces itself agitating such body of liquid and blowing or dragging a portion thereof into the next absorber conduit. Though the gas is described herein as travelling at a high velocity, this term is to be understood in a relative sense because the velocity of the gas will depend upon the conditions prevailing in the particular system as noted above; for example, in the particular embodiment of the invention disclosed herein, the velocity of gas flow through the absorber is of the order of a few feet per second if a dense gas, such as nitrogen, is utilized.

The flow of inert gas through the absorber is substantially continuous and steady though there is a pressure gradient from the inlet to the outlet portions thereof due to the throttling action of the liquid, particularly in rising conduits, on the gas stream. This insures substantially continuous uniform propulsion of liquid through the absorber and continuous absorption of refrigerant whenever the refrigerating mechanism is operating.

From the description above it will be seen that we have devised a refrigerating system in which the absorption solution flows upwardly through the absorber under the impetus of the inert gas stream passing therethrough and that the liquid is agitated by the gas to a great degree whereby to promote highly efficient absorption and efficient heat rejection from the absorber. It is also apparent that the circulating fan not only circulates the inert gas but causes circulation of the absorption solution through its circuit and elevates the liquid refrigerant into the top portion of the evaporator.

While we have illustrated and described but a single embodiment of our invention, it is to be understood that it is capable of expression in numerous other constructions and forms without departing from the spirit of the invention and the scope of the appended claims.

We claim:

1. Absorption refrigerating apparatus comprising a solution circuit including a boiler and an absorber, an inert gas circuit including an evaporator and said absorber, means for supplying liquid refrigerant to said evaporator, said absorption solution circuit being constructed and arranged to supply weak solution to the bottom of said absorber, and means for propelling a stream of dense inert gas upwardly through said absorber with sufficient velocity and pressure to propel the absorption solution upwardly through said absorber by the frictional drag of the inert gas flowing therethrough.

2. That improvement in the art of refrigeration which includes the steps of propelling a pressure equalizing medium through a circuit including evaporating and absorbing zones, introducing a portion of the pressure equalizing medium into a body of liquid refrigerant to elevate it into the evaporating zone, injecting the pressure equalizing medium into absorbing solution supplied to the bottom of the absorbing zone to introduce a predetermined amount of absorption solution into the absorption zone, and propelling the inert gas through the absorption zone with sufficient velocity and pressure to propel the absorption solution upwardly through said absorption zone by the frictional drag of the inert gas flowing therethrough, and separating pressure equalizing medium and absorbing solution at the top of the absorbing zone.

3. That method of absorbing a gas and a liquid in an absorbing zone having a plurality of portions of different slopes which includes the step of supplying an absorption solution to the lower portion of such absorbing zone, propelling a mixture of the gas to be absorbed and an inert medium through such absorbing zone, propelling the solution through portions of such zone having a slight slope by the frictional drag exerted on a stream of the solution by the gas stream flowing thereover, propelling the liquid through portions of said absorbing zone having a deep slope by propelling the gas stream through a finely divided body of solution and elevating a portion thereof by the frictional drag of the gas stream flowing therethrough, and simultaneously absorbing the gas in the solution as it is being propelled thereby.

4. Refrigerating apparatus including an absorber comprising a section having a small inclination to the horizontal and an elevating section, means for supplying absorption solution to a lower portion of such absorber, means for propelling an inert gas refrigerant vapor mixture through such absorber and over a liquid solution stream in the section thereof having a small inclination to the horizontal to flow the liquid solution therethrough and for forcing the inert gas refrigerant vapor mixture through a body of solution in the elevating section of such absorber to carry a portion of such solution upwardly therethrough.

5. That improvement in the art of refrigeration which includes the steps of supplying absorption solution to a portion of an absorbing zone, distributing the absorption solution through such zone by forcing a continuous unbroken stream of an inert pressure equalizing medium through said zone in contact with the absorption solution therein contained which exerts a propelling force upon such solution as it flows thereby, and absorbing refrigerant vapor contained in the inert pressure equalizing medium stream in such liquid.

6. That improvement in the art of refrigeration which includes the steps of propelling a pressure equalizing medium through a circuit including evaporating and absorbing zones, diverting a portion of the pressure equalizing medium circulating through said circuit and employing the same to operate a gas lift pump to elevate liquid refrigerant into said evaporating zone, supplying absorption solution to the lower portion of said absorbing zone, and circulating the absorption solution upwardly through said absorbing zone as it is absorbing refrigerant vapor in said pressure equalizing medium by the frictional drag exerted on the liquid by the propelled stream of pressure equalizing medium flowing in contact therewith.

7. An absorber adapted for use in refrigerating systems comprising a continuous inclined reversely bent conduit provided with a plurality of air-cooling fins, means for supplying absorbing solution to the bottom of said conduit, means for propelling a body of pressure equalizing medium and medium to be absorbed upwardly through said conduit, and means in said conduit for regulating the flow of fluids therethrough.

8. Refrigerating apparatus comprising a pressure equalizing medium circuit including an evaporator and an absorber, a solution circuit including said absorber and a boiler, a condenser connected to receive refrigerant vapor from said boiler, said condenser extending to a level below the top portion of said evaporator, means for propelling a pressure equalizing medium through said pressure equalizing medium circuit, a gas lift pump for elevating refrigerant liquid from said condenser into the top portion of said evaporator, and means diverting a portion of said pressure equalizing medium to operate said gas lift pump, the arrangement being such that solution is propelled through said absorber by said pressure equalizing medium.

9. That method of absorbing a gas in a liquid which includes the steps of flowing a mixture of the gas to be absorbed and a non-absorbable gas in a continuous stream across the surface of a stream of an absorbent with a velocity sufficient to agitate the absorbent and to exert a frictional drag on the absorbent sufficient to propel the same in the direction of flow of the mixture.

10. Absorption refrigerating apparatus comprising an inert gas circuit including an evaporator and an absorber, a solution circuit including a boiler and said absorber, means for liquefying refrigerant vapor produced in said boiler and for supplying the liquid to said evaporator, said absorber including a substantially horizontal conduit provided with heat rejecting means, and means for propelling inert gas through said conduit with sufficient force to convey absorption solution therethrough.

11. Absorption refrigerating apparatus comprising an inert gas circuit including an evaporator and an absorber, a solution circuit including a boiler and said absorber, means for liquefying refrigerant vapor produced in said boiler and for supplying the liquid to said evaporator, and power driven means in said inert gas circuit for forcing the inert gas to flow through said absorber with sufficient velocity to circulate the absorption solution through said solution circuit by the drag exerted on the liquid by the inert gas flowing thereby.

12. Absorption refrigerating apparatus comprising an inert gas circuit including an evaporator and an absorber, a solution circuit including a boiler and said absorber, means for liquefying refrigerant vapor produced in said boiler and for supplying the liquid to said evaporator, said absorber including a rising conduit having a steep slope, and power driven means for propelling the inert gas through said conduit with sufficient velocity to sweep or drag the absorption solution therethrough by the drag exerted on the liquid by the inert gas flowing thereby.

13. A refrigerating system of the absorption type including a vapor generating assembly, an evaporator, means for liquefying refrigerant vapor evolved in said vapor generating assembly and for supplying the liquid to said evaporator, an absorber, means for conveying absorption solution by gravity from said vapor generating assembly to one end of said absorber, means for conveying enriched solution by gravity from the other end of said absorber to said vapor generating assembly, and means forming a circuit for flow of inert gas between said evaporator and absorber including means for propelling the inert gas through said absorber with sufficient velocity and pressure to circulate the absorption solution from one end to the other end thereof by the frictional drag of the inert gas stream flowing in contact therewith.

14. That improvement in the art of absorption refrigeration which includes the steps of applying heat to a solution of a refrigerant in an absorbent to expel refrigerant vapor from the solution, liquefying the said refrigerant vapor by passing the same in heat transfer relationship with a cooling medium, conducting the liquefied vapor to a place of evaporation, evaporating the liquid refrigerant in said place of evaporation to produce a refrigerating effect by passing an inert medium through the place of evaporation in contact with the liquid, conducting solution weakened by previous expulsion of refrigerant vapor to a place of absorption, circulating the solution through said place of absorption by flowing inert medium and refrigerant vapor discharged from said place of evaporation through said place of absorption with sufficient velocity and pressure to convey the solution by the frictional dragging action of the inert medium on the solution, absorbing refrigerant vapor in the solution which the vapor contacts in the place of absorption and rejecting the heat of absorption to a cooling medium which is in heat transfer relationship with said place of absorption.

15. That improvement in the art of absorption refrigerating systems of the type utilizing a refrigerant, an absorbent for the refrigerant and a pressure equalizing gas which is inert with respect to the refrigerant and the absorbent which includes the steps of applying heat to the absorbent in a place of vaporization to expel refrigerant vapor therefrom, absorbing refrigerant vapor in the absorbent from a refrigerant vapor pressure equalizing medium mixture in a place of absorption, and circulating the absorbent through a circuit including said places of vaporization and absorption by propelling the pressure equalizing gas through a portion of said circuit in contact with the absorbent and with sufficient pressure and velocity to propel the absorbent by the frictional drag of the pressure equalizing gas.

16. That improvement in three-fluid absorption refrigerating processes of the pressure equalized type which includes the steps of applying heat to a solution of ammonia in an absorbent to expel ammonia vapor from the solution, liquefying the said ammonia vapor by passing the same in heat transfer relationship with a cooling medium, conducting the liquefied ammonia to a place of evaporation, evaporating the liquid ammonia in said place of evaporation to provide a refrigerating effect by passing nitrogen through the place of evaporation in contact with the liquid ammonia, conducting solution weakened by previous expulsion of ammonia vapor to a place of absorption, circulating the solution through said place of absorption by flowing nitrogen and ammonia vapor discharged from said place of evaporation through said place of absorption with sufficient velocity and pressure to convey the solution by the frictional dragging action of the nitrogen on the solution, absorbing ammonia vapor in the solution which the vapor contacts in the place of absorption, and rejecting the heat of absorption to a cooling medium which is in heat transfer relationship with said place of absorption.

17. That improvement in three-fluid absorption refrigerating processes of the pressure equalized type utilizing a refrigerant, an absorbent for the refrigerant, and a gaseous medium which is inert with respect to the absorbent and the refrigerant which includes the steps of supplying the absorbent to a place of absorption, and propelling a mixture of refrigerant vapor and inert medium through said place of absorption in contact with the absorbent with sufficient velocity and pressure to elevate the absorbent through the place of absorption as it is absorbing refrigerant vapor.

18. A refrigerating apparatus of the absorption type including an absorber having a gas and liquid passageway therethrough, means for supplying an absorbing medium to one end of said passageway, means for supplying a mixture of medium to be absorbed and an inert medium to said passageway with sufficient pressure and velocity to propel the absorbing medium through said passageway by the frictional drag of the inert medium and medium to be absorbed, and said apparatus being so constructed and arranged that the absorbing medium is non-uniformly distributed through said passageway by the inert medium and medium to be absorbed and said inert medium and medium to be absorbed pass into and out of the absorbing medium in a portion of said passage in which the absorbing medium is present in a relatively large quantity.

19. Absorption refrigerating apparatus comprising a solution circuit including an absorber and a boiler, an inert gas circuit including said absorber and an evaporator, means for supplying refrigerant vapor produced in said boiler to said evaporator in liquid phase, said absorber comprising an elongated finned conduit lying in a substantially horizontal plane, and means for propelling an inert gas refrigerant vapor mixture therethrough with sufficient velocity to sweep or drag the absorption solution therethrough.

WILLIAM H. KITTO.
ARNOLD D. SIEDLE.